United States Patent [19]
Pond

[11] Patent Number: 5,495,160
[45] Date of Patent: Feb. 27, 1996

[54] DIGITAL SINE WAVE GENERATOR AND MOTOR CONTROLLER

[75] Inventor: Robert J. Pond, Dolyestown, Ohio

[73] Assignee: Reliance Electric Company, Cleveland, Ohio

[21] Appl. No.: 163,279

[22] Filed: Dec. 6, 1993

[51] Int. Cl.[6] ................................................. G06F 15/46
[52] U.S. Cl. ..................... 318/801; 318/807; 318/812; 364/720; 395/142
[58] Field of Search ....................... 364/720, 721; 327/129; 318/800–802, 805–812; 395/142

[56] References Cited

U.S. PATENT DOCUMENTS

| | | | |
|---|---|---|---|
| 3,350,658 | 10/1967 | Walker . | |
| 3,411,110 | 11/1968 | Walker . | |
| 3,674,999 | 7/1972 | Kelling . | |
| 3,700,986 | 10/1972 | Cushman et al. . | |
| 3,917,932 | 11/1975 | Saita et al. . | |
| 4,310,791 | 1/1982 | Akamatsu | 318/800 |
| 4,348,627 | 9/1982 | Fulton | 318/807 |
| 4,371,933 | 2/1983 | Bresenham et al. | 364/720 X |
| 4,447,786 | 5/1984 | Saar et al. | 318/811 |
| 4,489,267 | 12/1984 | Saar et al. | 318/811 |
| 4,707,651 | 11/1987 | Schauder | 318/800 |
| 4,713,745 | 12/1987 | Schauder | 318/809 X |
| 4,736,201 | 5/1988 | Nakayama et al. | 364/720 X |
| 4,789,954 | 12/1988 | Iida et al. | 364/720 |
| 4,835,722 | 5/1989 | Clarke et al. | 364/720 |
| 4,999,797 | 3/1991 | Matsushiro et al. | 364/720 |
| 5,068,777 | 11/1991 | Ito | 318/811 X |
| 5,136,689 | 8/1992 | Walller | 395/143 |

*Primary Examiner*—Brian Sircus
*Attorney, Agent, or Firm*—Pearne, Gordon, McCoy & Granger

[57] ABSTRACT

Digital sinusoidal waves are generated using a method based on an error measuring algorithm used to generate a synthesized circle. X and Y waves are generated step-wise to follow the contour of a reference circle in the x-y plane by computing the mean square error at each step and using the error value to calculate the next values of X and Y. The digital sine waves are converted to three-phase, pulse width modulated signals. Direct current power is inverted to three phase power to operate a motor under the control of the PWM signals. The controller permits control of voltage, voltage-frequency ratio, boost voltage, and acceleration-deceleration.

21 Claims, 4 Drawing Sheets

DIGITAL SINE WAVE GENERATOR AND MOTOR CONTROLLER

BACKGROUND OF THE INVENTION

1. Field of the Invention

This invention relates generally to the field of inverter control and specifically to a sine wave generator for a motor controller.

2. Description of the Related Art

It has become increasingly desirable in recent years to power motors from direct current sources. Most DC motors require brushes which are susceptible to dirt and require maintenance. Permanent magnet type motors do not necessarily use brushes, but magnet technology has been unable to keep pace with the demand for large and inexpensive motors. Thus, it is common to invert direct current to alternating current which is used to power an AC motor such as an induction or synchronous type motor.

Typically, an inverter controls application of a DC voltage to the motor through an array of switches such as transistors which are controlled to create an alternating current. As is known in the art, one or more control signals are used to control the switches. The control signals most commonly are derived from a sine wave. In many cases, the sine wave is a digital word used to generate a pulse width modulated signal which, in turn, controls the transistors.

Most commonly, the sine wave is generated by a microprocessor which refers to a look-up table of sine values and multiplies those values as needed. However, a microprocessor can be relatively expensive. Another method involves directly calculating sine wave values, however, such calculations are not merely arithmetic and, therefore, require complex circuitry or a microprocessor. In any case, sine values must be multiplied to increase or decrease the magnitude of a control signal, for example, for acceleration of a motor.

It would be desirable to generate a digital sine wave signal for an inverter without complex or expensive circuitry. Variable amplitude and variable frequency sine waves can be generated by using simple arithmetic calculations.

SUMMARY OF THE INVENTION

Points on an x-y plane can be generated so as to follow a desired curve according to a method called the Bresenham technique. According to the Bresenham technique, a sequence of points (X,Y) are generated that minimize the error from the desired curve. According to this technique, a circle can be generated in the x-y plane wherein the x and y values represent digital cosine and sine waves, respectively, from elementary trigonometry.

By calculating the algorithms necessary to implement the Bresenham method, the only operations required are add, subtract and multiply by two (logic shift left). Therefore, the circuitry required is much simpler and more economical than the microprocessor approach.

The present disclosure describes in detail a circuit using programmable logic components. However, it is understood that the invention could be implemented by programming the steps into a microprocessor or a bit-slice computer, or by using discrete logic elements, for example. The means used to implement the invention depends on the speed and accuracy required which typically depend on the characteristics of the inverter or the motor and its application.

DESCRIPTION OF THE PREFERRED EMBODIMENT

Figure 1:
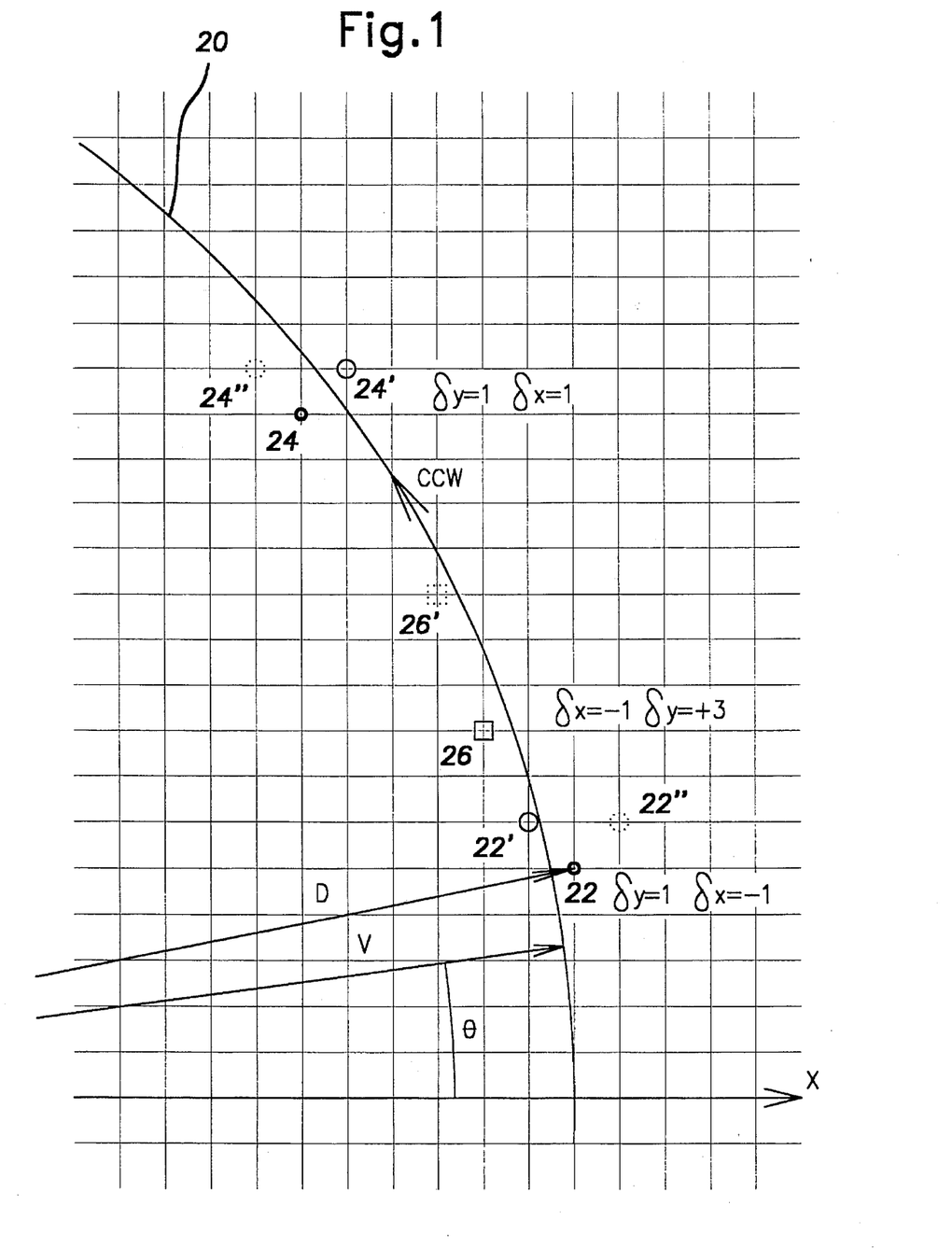
FIGS. 1 and 1A show a grid in an x-y cartesian coordinate plane and a portion of a circle centered at the origin.

Referring to FIG. 1, an arc of an ideal or reference circle 20 having its center at the origin of a cartesian coordinate system and a given radius V is shown on the grid. Each block on the grid represents a unit value. As a circle is traced about the origin, the x and y coordinates of points on the circle comprise cosine and sine waves according to the equations:

$$x = V \cos \Theta \text{ and} \tag{1}$$

$$y = V \sin \Theta, \tag{2}$$

where $\Theta$ is the angle between the radius V to a selected point and the x-axis. In other words, if the y components of coordinates of a circle are plotted against time as the circle is traced in the counterclockwise direction, the resulting curve is a sine wave. The angle $\Theta$ between the radius V to the point and the x axis is proportional to the time required to reach the point.

Figure 3:
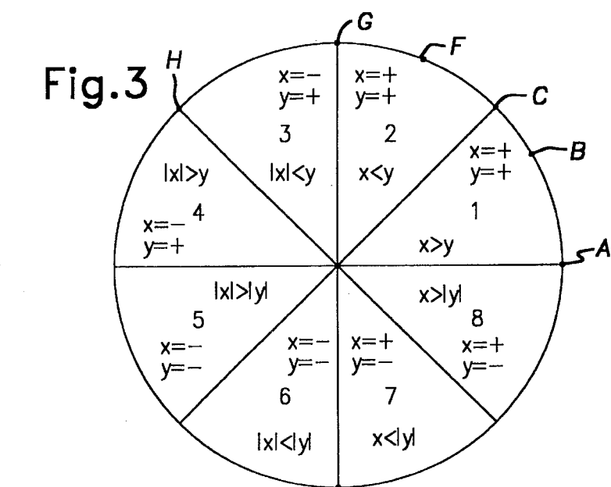
FIG. 3 shows a circle having numbered octants.
Figure 4:
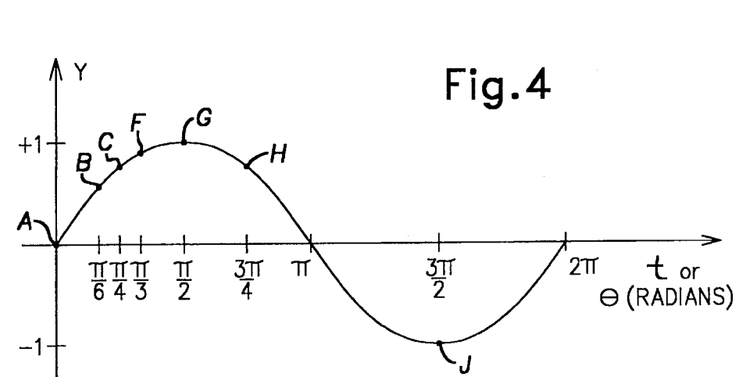
FIG. 4 shows a sine wave corresponding to the coordinates of the circle of FIG. 3.

As shown in FIG. 4, points on the circle of FIG. 3 correspond to points on the sine wave. Assuming a circle of radius equal to one, at point A, Y=0. At point B, $X=\sqrt{3}/2$ and Y=½, that is, Y=sin 30°=sin $\pi/6$. At point C, $X=1/\sqrt{2}$ and $Y=1/\sqrt{2}$, that is, Y=sin 45°=sin $\pi/4$. At point F, X=½ and Y= $\sqrt{3}/2$ or Y=sin 60°=sin $\pi/3$. At point G, X=0 and Y=1 or Y=sin 90°=sin $\pi/2$. The correspondence continues through 360° ($2\pi$ radians), and then repeats. Other selected points shown in FIGS. 3 and 4 are H where $X=-1/\sqrt{2}$, $Y=1/\sqrt{2}$=sin 135°=sin $3\pi/4$. At point J, X=0, Y=−1=sin 270°=sin $3\pi/2$. Similarly, X values of coordinates of a circle correspond to a cosine wave. Thus, if a circle is generated, sine and cosine waves can be extracted by tracking the X and Y coordinates.

The invention generates a synthesized digital circle, having coordinates $X_n$ and $Y_n$, which generally follows the reference circle. The reference circle may be equivalent to $X^2+Y^2=V^2$. By generating the synthesized circle, trigonometric functions can be derived, such as sine and cosine waves according to equations (1) and (2). It is assumed for simplicity that starting X and Y values are on the reference circle with the desired radius V. A technique, known as the Bresenham algorithm, provides for measuring the error from the exact X and Y coordinates to the reference circle and incrementing X and Y to reduce the error. Using the error signal, a digital circle is synthesized which "dithers" about the reference circle position by ±1 unit. Where digital registers are used to implement the system, a unit is represented by a least significant bit (LSB). As shown in FIG. 1, rarely do the grid intersections (allowed X and Y values) fall on the circle. The least error achievable in a system with discrete values is where X and Y are selected to be within one increment of the circle 20, depending on the decision process. The error is calculated as the synthesized circle is generated to avoid deviating more than one least significant bit from the desired circle.

The distance D of a point (X,Y) from the origin of an x-y plane is given by the equation:

$$D^2 = X^2 + Y^2. \quad (3)$$

The distance R from a point on a circle centered at the origin to the origin is the radius of the circle. For the circle 20 in FIG. 1, the distance to the origin is the radius V;

$$R^2 = V^2. \quad (4)$$

Thus, it can be seen that the mean square error E between the circle 20 and a point (X, Y) on the grid is:

$$E = D^2 - R^2 \quad (5)$$

or $$E = X^2 + Y^2 - V^2. \quad (6)$$

If X, Y, and V are deiscretized, then $$E_n = X_n^2 + Y_n^2 - V_n^2. \quad (7)$$

The error could be measured in the opposite direction, that is: $E = R^2 - D^2$. The signs of variables would be changed, but the following discussion would be essentially the same.

A sequence of values of $X_n$ and $Y_n$ are desired that conform generally to the circle 20 having radius $V_n$. Assuming that $V_n$ is a constant, V, then the mean square error at the next point (n+1) will be given by $$E_{n+1} = X^2_{n+1} + Y^2_{n+1} - V^2. \quad (8)$$

Referring to FIG. 1, the octant $0 \leq \Theta \leq \pi/4$ is initially considered. X is selected as a dependent variable and Y is selected as an independent variable. If the circle is generated in the counterclockwise direction in unit steps, then $$Y_{n+1} = Y_n + 1. \quad (9)$$

The magnitude and direction of the steps are selected for simplicity and not of necessity.

To further ensure simplicity of the preferred circuitry which will implement this method, the dependent variable X is always incremented by positive or negative unit values. Thus, $$X_{n+1} = X_n \pm 1. \quad (10)$$

Improved accuracy can be achieved, at the expense of more complex circuitry, by permitting increments of zero magnitude. The "±" in (10) indicates that a decision must be made when incrementing X (δX) in order to conform to the circle. $X_{n+1}$ should be selected to conform to the circle as nearly as possible within the rules defined in (9) and (10). If (9) and (10) are substituted into (8) and rearranged, then $$E_{n+1} = (X_n \pm 1)^2 + (Y_n + 1)^2 - V^2, \quad (11)$$

$$= \pm 2X_n + 2Y_n + 2 + E_n. \quad (12)$$

The desired quantity, $E_{n+1}$, is computed by using addition, subtraction, multiplication by two (shift left one bit in the binary number system) and the previous error value $E_n$. Incrementing the variables X and Y by values other than one, such as zero, is accomplished according to the same decisional process described above, but requires different logic and additional steps.

This recursive calculation is suitable for implementation in a "state machine." That is, the output, in this case the error, is computed in programmable logic devices which use the output in the subsequent computation each time the devices are clocked. The ± sign (X is either incremented by plus or minus one in the first octant) is determined from the sign of $E_n$. First, assuming that the direction of motion is counterclockwise, it can be seen in FIG. 1 that when E is greater than zero, point 22 is outside the circle and X must be decremented (incremented by negative one) to reduce the error. If the error is measured in the opposite direction, the sign of the error would be negative in this example. Point 22' is the correct choice whereas point 22" increases the error. Similarly, where E is less than zero, X must be incremented. This is shown at point 24 where 24' is the best choice; point 24" increases the error. Therefore, a simple algorithm for δX can be derived by examining the sign of E. In a two's complement number system this is the most significant bit (MSB). The initial condition of $E_0$ is preferably set so that the starting point lies on the circle, that is, $E_0 = 0$. The selection of whether to increment by plus or minus one when $E_n = 0$ is arbitrary.

It may not be apparent why Y was selected as the independent variable in the above example. Assuming that a point 26 is in the first octant and that X is the independent variable and is decremented by one, FIG. 1 shows that in this case the Y increment to follow the circle will be greater than one, that is, δY=+ to point 26', in order to stay within one unit of the reference circle. However, this violates the basic assumption that X and Y are changed by one. Allowing for changes greater than one could be accommodated at the expense of much higher circuit complexity. In other octants of the circle, this analysis is reversed, and it is preferable to use X as the independent variable. This is the case, for example, in octant 2 shown in FIG. 3.

An additional requirement for the digital sine generator is the ability to change the amplitude (radius) of the reference circle in order to change the voltage output of an inverter supplying a voltage to a motor, for example. The mathematics for this case are similar to those described above. The error formula becomes:

$$E_{n+1} = \pm 2X_n + 2Y_n + 2 \pm 2V_n - 1 + E_n, \quad (13)$$

assuming a unit increment in the radius, i.e., $$V_{n+1} = V_n \pm 1. \quad (14)$$

Therefore, the error value accuracy can be retained under the condition of variable amplitude by inserting another incrementing means, such as an adder stage, to include changes in radius V (δV). The ± in front of $V_n$ in (13) is the opposite of the sign of the increment of $V_n$ in (14).

When the shape of the synthesized circle being generated is perturbed by a positive or negative increment of the radius V, the error computation remains accurate, however, the concept of a circle no longer has meaning. For simplicity of explanation, the form being generated will be referred to as a synthesized circle, although the form will actually be fairly irregular, depending on the size of the increments and variations in the radius V.

Equation (13) is used to determine the error in the first octant of the circles. The signs in the equation must be modified to apply to other octants while adhering to the same general rules. The octant, as shown in FIG. 3, can be determined from the signs and relative magnitudes of X and Y.

While equation (13) above is accurate in computing the circle error, it is awkward to implement due to the simultaneous changing of all three variables: $X_n$, $Y_n$ and $V_n$. A better way to evaluate (13) is to perform the additions (or subtractions) in a phased arrangement. That is, first perform (for the case of octant 1) the Y-increment, then the X-increment/decrement, and then the V-increment/decrement (if needed). This way, a single adder can be used preceded by a 3-input multiplexer which chooses the appropriate vector with vector selection signals $X_{sel}$, $Y_{sel}$, and $V_{sel}$.

Figure 1A:
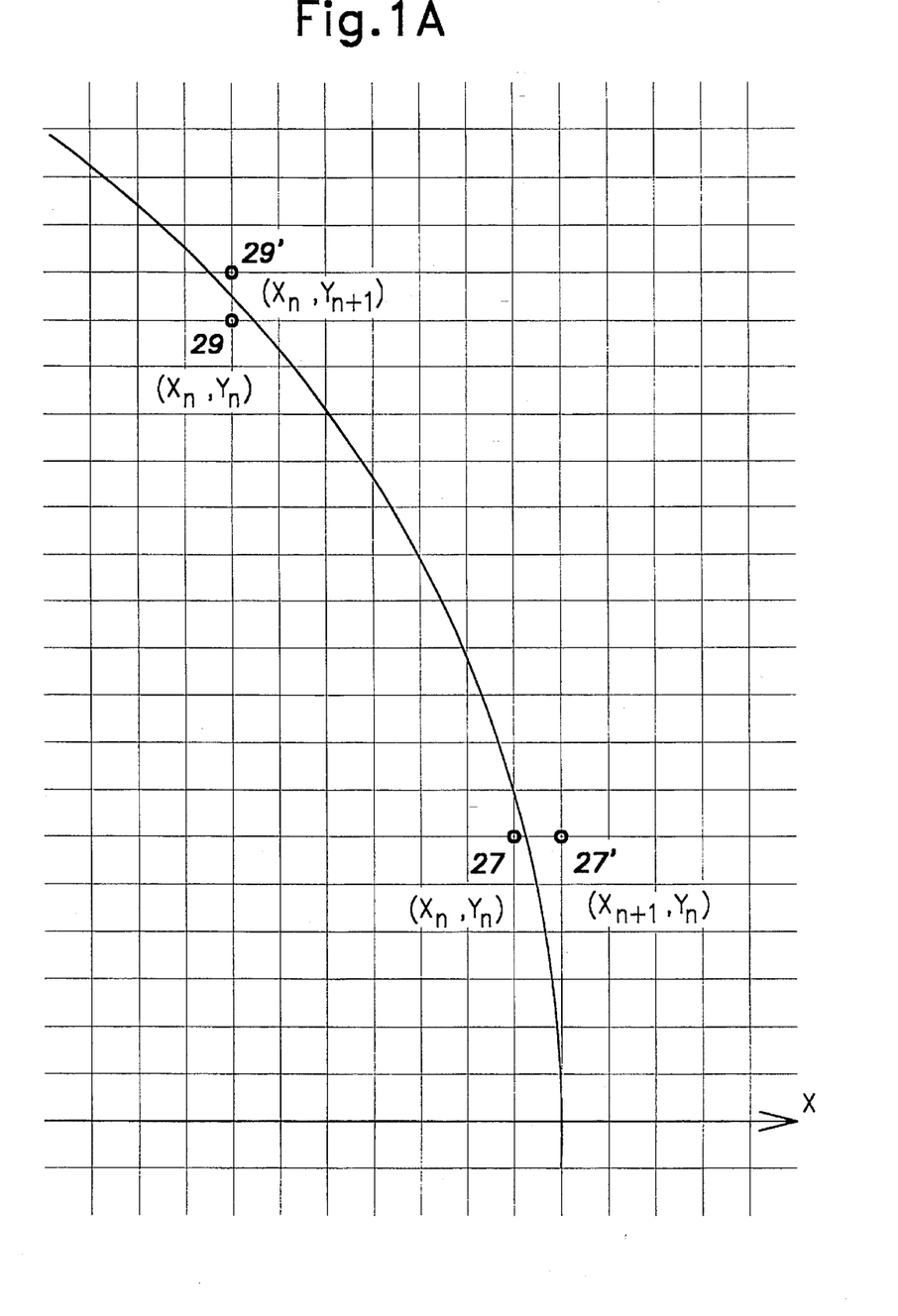

Decision logic is required to determine the independent variable. This is done by comparing the magnitudes of X and Y. The one with the smaller magnitude is the independent variable. As shown in FIG. 1A, the dependent variable is incremented or "dithered"across the reference circle from point $X_n$ to $X_n+1$, as shown at point 27 of octant 1. Similarly, in octant 2, $Y_n$ is dithered across the reference circle as $X_n$ is held fixed at point 29. The advantage of this approach is that the dither rate can be much higher than the rate at which the independent variable changes. This method is implemented in a 4-phase clocking system, as shown below:

| Phase I | Change independent variable (if necessary) |
| Phase II | Increment dependent variable according to error |
| Phase III | Change amplitude (if necessary) |
| Phase IV | Increment dependent variable again |

The second increment or "dither" in the computation cycle helps the feedback system recover quickly from disturbances due to V changes, particularly when X and Y are nearly equal.

By changing only one variable at a time, the error computation math is greatly simplified. That is, all of the calculations are the same and follow the general form below:

$$E_{n+1} = E_n \pm 2\, W_n + 1 \tag{15}$$

Where W=X, Y or V as required for the particular phase of the cycle that is current. The +1 addition is easily accomplished in logic adders by setting the "carry input"=1. The factor of 2 is easily inserted by a logical shift left in binary notation. The form of the equation above is implemented in an "adder-accumulator" structure, common in digital logic.

Each quadrant of the circle corresponds to a quadrant ($\pi/2$ radians) of the sine wave generated. The variable X or Y having the smaller magnitude is the independent variable. Thus, each of the signals X and Y is designated as the independent variable in succession to form the circle. The sign in front of the independent variable matches the sign of the increment. For example, in the first octant, the independent variable Y is incremented by steps of +1, thus, its sign is +. As previously discussed, the choice of the ± sign in front of the dependentvariable is the opposite of the sign of the error $E_n$.

Complications related to determining the octant being generated at a given time can be eliminated or reduced by providing a circuit which generates only one octant of the circle. After the first octant is generated, the X and Y terms are exchanged to generate the next octant of the synthesized circle. The X and Y values for subsequent quadrants can be obtained by repeatedly generating the octant, exchanging the X and Y terms, and changing the signs of the X and/or Y values to correspond to the quadrant nominally being generated.

Note that if equation (13) is calculated at one time using adders (rather than the phased calculation), subtractions cannot be performed directly. Thus, the ± signs and occasional one's or two's in the error expressions create inaccuracies when calculating the error $E_{n+1}$. In practice, it has been found that these inaccuracies should be corrected. There are many solutions to these problems. For example, the two's complement of numbers preceded by a negative sign can be generated and added. This requires another adder. Another method logically inverts negative numbers and applies a correction term after all additions are completed. These problems can be avoided by implementing the phased calculation described above.

For most applications it is also necessary to accurately control the signal frequency. Again referring to the first octant, if Y is incremented at a fixed clock rate then a non-uniform circle generation rate is obtained. Since:

$$X = V \cos \Theta, \tag{16}$$

$$Y = V \sin \Theta, \text{ and} \tag{17}$$

$$\frac{dY}{dt} = V \cos\Theta \frac{d\Theta}{dt} = X \frac{d\Theta}{dt}, \tag{18}$$

if Y is incremented at a constant rate, $d\Theta/dt$ will not be constant because X is not constant. To overcome this problem Y is incremented at a rate proportional to the product of the desired angular frequency and the current value of X. This can be easily accomplished by using a rate multiplier, that is, a modified form of a counter.

Remaining details of the synthesized circle generator include selecting the signs of the variables correctly when changing from one octant to another. Additional circuitry must be added to perform inverter-type functions; that is, provisions must be made for a constant or programmable ratio between frequency and voltage (Volts/Hz for constant torque), voltage boost at low frequency, and variable acceleration/deceleration rates.

According to the preferred embodiment, the circle generator is implemented by using a gate array or a standard cell. Alternatively, discrete logic elements, a bit-slice computer or a microprocessor can be used.

Figure 2:
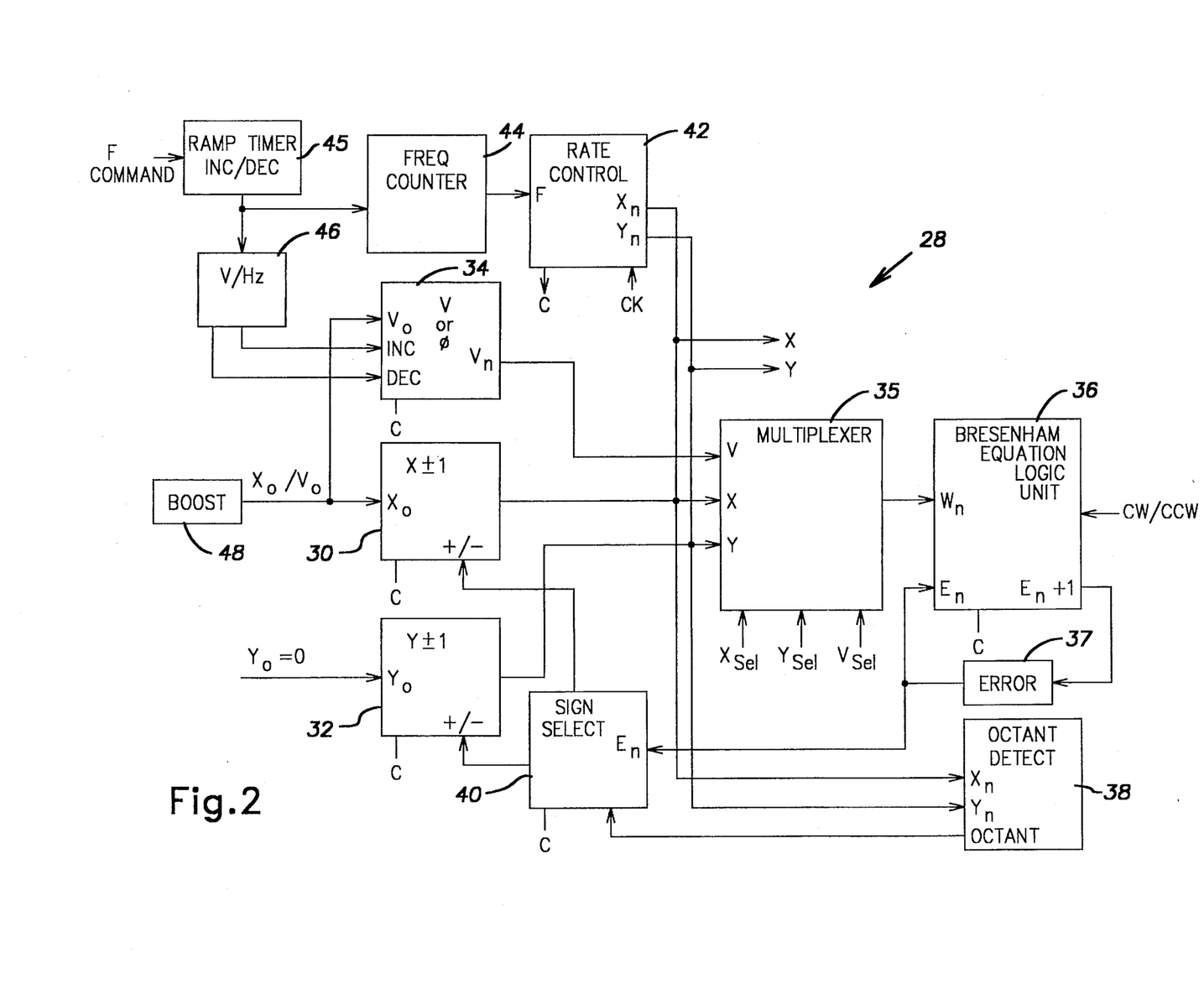
FIG. 2 shows a schematic block diagram of circuit components according to one embodiment of the invention.

Referring to FIG. 2, an apparatus 28 used to implement the synthesized circle generator includes a presettable, updown X counter 30 used to store and increment values of X. The X counter 30 has an initializing input used to preload an initial value $X_0$. In the preferred case where the starting point is at the intersection of the reference circle and the x-axis, $X_0$ equals $V_0$. A sign input is provided to select whether X is incremented by a positive or negative amount, that is, whether X is incremented or decremented. In the preferred embodiment, X is always incremented by plus or minus one. A clock input is also provided.

A presettable, up-down Y counter 32 similar to the X counter 30 is provided with an input for setting an initial value $Y_0$. A sign input is provided to select whether Y is incremented by a positive or negative amount. In the preferred embodiment, Y is always incremented by plus or minus one. A clock input is also provided.

Where the synthesized circle to be generated will follow a variable radius V of the reference circle corresponding to a system characteristic such as voltage, a V counter 34 is provided. The V counter is presettable with an initial value $V_0$ and includes inputs to increase and decrease V. In the preferred embodiment, the V counter 34 is similar to the X counter 30 so that V is incremented in steps of plus or minus one. A clock input is also provided.

Outputs from each of the counters 30, 32, and 34 are input to a multiplexer 35. A single output of multiplexed X, Y and V signals is input to a programmable logic unit 36 which calculates the error signal $E_{n+}$. A CW/CCW input is provided to select the direction of generating the circle. Preferably starting with initial input values $X_0$, $Y_0=0$, $V_0=X_0$, and $E_0=0$, the logic unit 36 calculates $E_{n+1}$ according to equation (15) which is fed back through an error register 37 to become the input value of the error $E_n$ for the next calculation. As discussed above, with reference to equation (15), the logic unit 36 makes one calculation of $E_n$ for the independent variable (X or Y) and a second calculation for V. The multiplexer permits separate calculations to be performed by the same logic unit.

The logic unit 36 can perform the calculation of $E_{n+1}$ in many ways. In a simple embodiment, adders are used to perform sums. Multiplication by two is accomplished by a shift left of digital values.

Cosine and sine wave signals represented by the synthesized circle coordinates X and Y are input to an octant detector 38. The octant detector uses coordinates $X_n$ and $Y_n$ to determine which octant of the circle is being generated. Referring to FIG. 3, the octant can be determined from the signs and relative magnitudes of the coordinates.

A signal representing the octant detected is input to a sign selector 40 which determines which variable X or Y is the independent variable and whether it should be incremented by positive or negative one. Referring to FIG. 3, when the coordinates fall in the first, fourth, fifth, or eighth octant, Y is the independent variable, otherwise, X is the independent variable. The error signal $E_n$ is also fed back from the logic unit 36 to the sign selector 40 which determines whether the dependent variable X or Y should be incremented by a positive or negative amount. The sign selector requires only the sign ($\pm$) of the error signal $E_n$, not the magnitude. The sign can be represented by the most significant bit of the error signal.

As an example, in the preferred embodiment, if the point $(X_n, Y_n)$ is in the third octant, then X is the independent variable and Y is the dependent variable. Accordingly, X is incremented by negative one to continue a counterclockwise generation of the synthesized circle. The dependent variable Y is incremented according to the sign of the error signal $E_n$. If $E_n$ is positive, meaning that the point $(X_n, Y_n)$ is outside the circle, then $Y_n$ is incremented by negative one to follow the reference circle. If $E_n$ is negative, then $Y_n$ is incremented by positive one. Thus, the dependent variable is incremented according to the reverse of the sign of the error signal $E_n$. The process is repeated for the calculation based on the increment of V.

Returning to FIG. 2, signals from the sign selector 40 are input to the X and Y counters 30, 32 to increment $X_n$ and $Y_n$ accordingly. The error register 37, octant detector 38, and sign selector 40 collectively comprise a feedback means to increment X and Y through the counters 30, 32.

As discussed above in reference to equation (18), when generating the circle in a stepwise manner, it is necessary to vary the rate at which the independent variable is incremented to maintain a constant rate $d\Theta$ of generating the synthesized circle. Thus, an angular rate control 42 is provided which receives coordinate information from the X and Y counters 30, 32. The angular rate control 42 provides an output which is used to control the clock inputs of the various components, thereby controlling the rate at which the circle is traversed. The angular rate control 42 comprises, for example, a rate multiplier. A frequency counter 44 is used to store a value F which is proportional to the frequency of the signals X and Y to be generated. The rate multipliers receive and multiply an input clock signal CK to output a clock signal C proportional to a selected frequency F input to the frequency counter 44. The frequency can be varied by F command inputs to a ramp timer 45 to control the speed of a motor.

It is desirable to control the ratio between voltage and frequency in order to maintain constant torque of a motor. In such cases, a voltage/frequency (V/Hz) controller 46 is provided which has an input used to select the desired ratio. The V/Hz controller has outputs to the voltage counter 34 to automatically control the voltage to maintain the desired ratio. In other applications, the V/Hz controller 46 is used to control the ratio of whatever quantities are represented by the radius V and the sweep rate $d\Theta/dt$. A limit detector can be used to maintain the radius V and/or angular rate $d\Theta/dt$ within desired limits.

At low speeds, it is desirable to increase the voltage above the V/Hz ratio to maintain constant torque and overcome motor winding resistance. This is accomplished by presetting the X and V registers to a value $\neq 0$ when F=0, with a presetting boost 48.

A digital cosine wave X and a digital sine wave Y are generated at the outputs from the X counter 30 and Y counter 32, respectively. As discussed above, with reference to FIGS. 3 and 4, a cosine and sine wave can be extracted from the X and Y coordinates of the synthesized circle. The waves X and Y are digital values generated in a stepwise manner which conform generally to sinusoidal waves. The accuracies of the waves X and Y depend upon the resolution of the coordinates on which the circle is generated. That is, greater accuracy requires smaller increments of the variables, which, in turn, requires higher counter capacity and greater arithmetic capacity. In practice, it has been found that a synthesized circle which is generated with 8 bit accuracy is adequate for many motor applications.

The primary function of the synthesized circle generator described is to generate sine waves. Other trigonometric functions which are not necessarily sinusoidal could be generated by extracting different values from the circle generated. Such functions are considered to be within the scope of the invention and fall within the definition of a sine wave for the purposes of this disclosure.

The synthesized circle generator described is adapted to repeatedly generate a complete circle. However, because trigonometric functions, such as sine waves, are symmetrical, a portion of a circle could be generated and reoriented to provide the complete circle. For example, a quadrant of the circle could be generated to provide a quadrant of a sine wave which could be rotated about a vertical axis and then a horizontal axis to complete the curve.

Once digital values for X and Y are available they must be converted into variable duty cycle square waves suitable for switching power transistors on and off. This process is called modulation, or more specifically, pulse width modulation.

When using the sine wave generator with an inverter, the goal is to generate at least single phase, and for higher power, three phase, vector voltage commands. These can be derived from the digital cosine and sine waves, X and Y, respectively. Single phase commands can be derived directly from either X or Y. Three phase vector voltage commands R, S and T are such that their magnitudes lie on the circumference of the circle. This comes from trigonometric identities relating the three vectors which are phase-shifted by 120°. The three phases are easily generated from the x and y signals since:

$$S = -\frac{X}{2} + \frac{\sqrt{3}}{2} Y, \qquad (20)$$

and $$T = \frac{X}{2} - \frac{\sqrt{3}}{2} Y. \quad (21)$$

Multiplying by √3 may seem to present a problem in the preferred digital counter and adder embodiment, but this can be implemented relatively simply with adders since a constant (not a variable) is to be multiplied.

Figure 5:
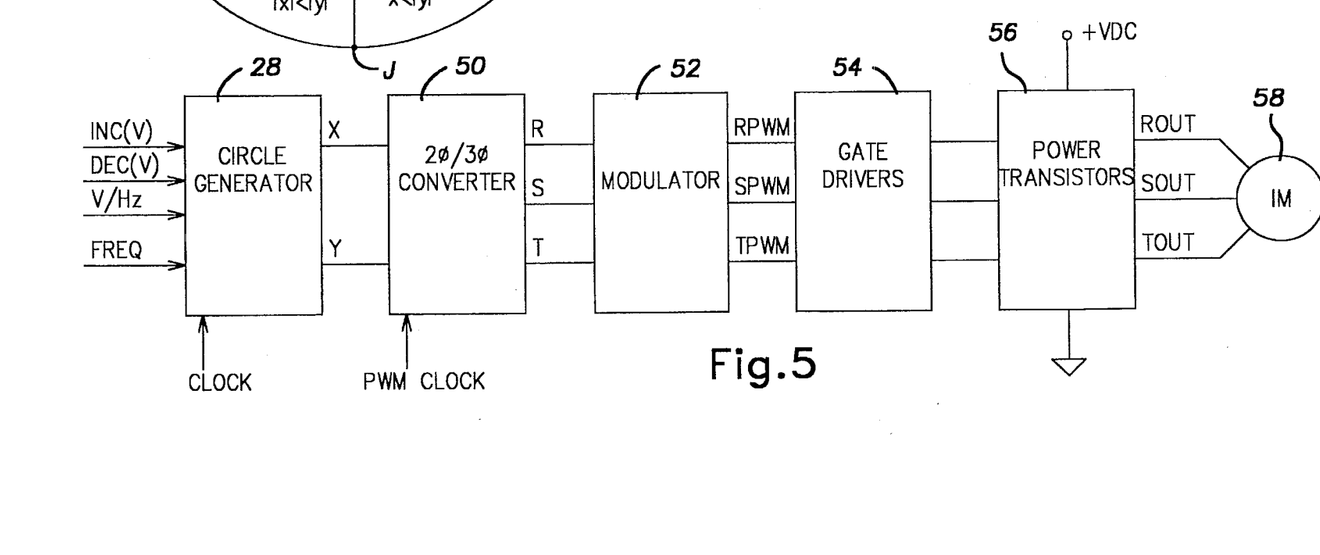
FIG. 5 shows a schematic block diagram of a wave generator, inverter and motor according to the present invention.

Referring to FIG. 5, a two-phase to three-phase converter 50 receives the digital sine waves X and Y from the circle generator 28 and performs the operations of equations (19), (20), and (21) to output a three-phase signal comprising sinusoidal waves R, S, and T.

A modulator 52 uses the signals R, S, and T to generate three-phase pulse width modulated (PWM) signals $R_{pwm}$, $S_{pwm}$, and $T_{pwm}$. As is known, the width of each pulse corresponds to the magnitude of each value $R_n$, $S_n$, or $T_n$. The PWM signals are used to operate a gate driver circuit 54, which in turn switches an array of power transistors 56 on and off. The power transistors 56 are connected to a direct current power source such that the direct current is inverted to three-phase alternating current as is known in the art.

In the embodiment shown, the inverted current is used to power and control a motor 58, such as an induction motor. However, any alternating current load which is to be supplied from a direct current source can be powered and controlled by the system described herein.

Voltage, frequency, acceleration/deceleration, voltage to frequency ratio (V/Hz) and voltage boost of the motor 58 can all be controlled by user-operated inputs represented by the corresponding parameters of the circle generator. Thus, effective and efficient control of the motor is achieved.

The present disclosure describes several embodiments of the invention, however, the invention is not limited to these embodiments. Other variations are contemplated to be within the spirit and scope of the invention and appended claims.

What is claimed is:

1. A digital sine wave generator for an inverter, comprising, in combination:

means to define a reference circle having a radius V;

means to increment a value of one of digital signals X and Y as an independent variable on an x-y coordinate system in combination with the other of signals Y and X as a dependent variable signal to form at least part of a synthesized circle;

means to determine the algebraic sign of an error signal between a point ($X_n$, $Y_n$) on the synthesized circle and the reference circle;

feedback means to increment the dependent variable responsive to the algebraic sign of the error signal on each previous increment;

means to obtain the sequential digital values of at least one of the X and Y signals to generate a digitized sine wave; and means to control an inverter responsive to the sine wave.

2. A wave generator according to claim 1, wherein each of signals X and Y is designated as the independent variable in succession to form a quadrant of the synthesized circle and to generate one quarter of a period of the digitized sine wave.

3. A wave generator according to claim 1, further comprising means to control a motor responsive to the wave.

4. A wave generator according to claim 3, further comprising a motor controlled by the motor control means.

5. A wave generator according to claim 1, wherein the inverter control comprises a means to convert the wave to a three phase signal.

6. A wave generator according to claim 1, wherein the inverter control comprises a means to convert the wave to a pulse width modulated signal.

7. A wave generator according to claim 1, wherein the feedback means is adapted to increment the dependent variable so as to minimize the error of the subsequent point on the synthesized circle.

8. A wave generator according to claim 1, wherein the incrementing and feedback means are adapted to increment the variables in unit steps.

9. A wave generator according to claim 1, wherein the feedback means is adapted to increment the dependent variable according to the opposite of the sign of the error.

10. A wave generator according to claim 1, further comprising means to vary the radius V of the reference circle.

11. A wave generator according to claim 10, wherein the radius varying means is adapted to vary the radius in unit steps.

12. A wave generator according to claim 1, wherein the radius V is proportional to a voltage to be controlled.

13. A wave generator according to claim 1, wherein the radius V is proportional to a magnetic flux to be controlled.

14. A wave generator according to claim 1, further comprising means to control a rate dΘ at which the circle is synthesized by controlling the rate of the increments.

15. A wave generator according to claim 1, wherein a rate dΘ at which the circle is synthesized is proportional to a frequency to be controlled.

16. A wave generator according to claim 1, wherein each of signals X and Y is designated as the independent variable in succession to form a quadrant of the synthesized circle and to generate one quarter of a period of the digitized sine wave; and further comprising means to vary the radius V of the reference circle; and means to control a rate dΘ at which the circle is synthesized by controlling the rate of the increments.

17. A motor and controller, comprising:

a motor;

means to generate a digital wave signal comprising a series of values of one of coordinates $X_n$ and $Y_n$ of a synthesized digital circle having coordinates ($X_n$, $Y_n$), said synthesized circle being generated by measuring error $E_n$ between a point ($X_n$, $Y_n$) of the synthesized circle and a reference circle having a given radius V and using a sign of the error $E_n$ to select a subsequent point ($X_{n+1}$, $Y_{n+1}$) so as to minimize the error $E_{n+1}$ of the subsequent point; and means to control power to the motor responsive to the digital wave signal.

18. A motor and controller according to claim 17, further comprising means to convert direct current to alternating current responsive to the wave signal.

19. An inverter control, comprising, in combination;

means to increment values X and Y on an x-y coordinate system to approximate part of the circumference of a circle and to obtain at each increment the digital values of the x and y components thereof;

means to compute at each increment an algebraic sign of an error between the point on the x-y coordinate system and a reference circle having radius V;

feedback means using the sign of the error to minimize said error for a subsequent increment; and means to obtain at each increment at least one of the values X and Y to control at least one phase of an inverter.

20. A method of controlling an inverter, comprising the steps of:

defining a reference circle having a radius V;

calculating a sign of an error between a point (X, Y) on a synthesized circle and the reference circle;

incrementing a independent variable chosen from one of X and Y;

incrementing a dependent variable chosen from the other of X and Y responsive to the sign of the error calculated; and controlling current in an inverter with a signal comprising at least one of the values X and Y.

21. A method according to claim 20, further comprising the steps of:

incrementing the radius V;

calculating a second error between point (X, Y) and the reference circle; and incrementing the dependent variable responsive to the error.

* * * * *